United States Patent
Tamura et al.

(10) Patent No.: US 9,983,633 B2
(45) Date of Patent: May 29, 2018

(54) ELECTRONIC DEVICE

(71) Applicant: LENOVO (SINGAPORE) PTE. LTD., Singapore (SG)

(72) Inventors: Fumio Tamura, Tokyo (JP); Yoshiyuki Shibayama, Gunma-ken (JP); Ryo Otsuka, Kanagawa-ken (JP); Eiji Shinohara, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 30 days.

(21) Appl. No.: 15/340,821

(22) Filed: Nov. 1, 2016

(65) Prior Publication Data

US 2018/0017989 A1    Jan. 18, 2018

(30) Foreign Application Priority Data

Jul. 12, 2016  (JP) .................. 2016-137738

(51) Int. Cl.
*G06F 1/16* (2006.01)
*H01H 13/705* (2006.01)

(52) U.S. Cl.
CPC .......... *G06F 1/1664* (2013.01); *G06F 1/1662* (2013.01); *G06F 1/1666* (2013.01); *G06F 1/1681* (2013.01); *H01H 13/705* (2013.01); *G06F 1/1616* (2013.01)

(58) Field of Classification Search
CPC .... G06F 1/1664; G06F 1/1666; G06F 1/1681; H01H 13/705; H01H 13/10; H01H 13/86
USPC ..................................... 361/679.13
See application file for complete search history.

(56) References Cited

U.S. PATENT DOCUMENTS

| | | | | |
|---|---|---|---|---|
| 5,587,875 A | * | 12/1996 | Sellers | G06F 1/1616 200/344 |
| 5,594,618 A | * | 1/1997 | Sellers | G05G 9/047 200/6 A |
| 5,790,370 A | * | 8/1998 | Merkel | G06F 1/1666 361/679.08 |
| 9,632,530 B2 | * | 4/2017 | Jacobs | G06F 1/1662 |
| 2015/0092331 A1 | * | 4/2015 | Kinoshita | G06F 1/1681 361/679.09 |
| 2016/0047156 A1 | * | 2/2016 | Hsu | F16H 21/44 16/239 |
| 2016/0048175 A1 | * | 2/2016 | Hsu | G06F 1/1681 16/244 |
| 2016/0102487 A1 | * | 4/2016 | Kuramochi | E05D 3/12 361/679.27 |
| 2016/0201367 A1 | * | 7/2016 | Kato | E05D 3/12 361/679.09 |

FOREIGN PATENT DOCUMENTS

WO    WO 2015076833 A1 *  5/2015  .......... G06F 1/1618

* cited by examiner

*Primary Examiner* — Nidhi Thaker
(74) *Attorney, Agent, or Firm* — Russell Ng PLLC; Antony P. Ng

(57) ABSTRACT

An electronic device disclosed. The electronic device includes a first chassis, a second chassis, and a hinge mechanism that connects the first chassis and the second chassis. The electronic device also includes a cylindrical cam member, a slide member and a movable member that moves in conjunction with a movement of the slide member in the axial direction and which extends from and retracts to an outer surface of the first chassis.

9 Claims, 14 Drawing Sheets

ELECTRONIC DEVICE

PRIORITY CLAIM

The present application claims benefit of priority under 35 U.S.C. §§ 120, 365 to the previously filed Japanese Patent Application No. JP2016-137738 with a priority date of Jul. 12, 2016, which is incorporated by reference herein.

TECHNICAL FIELD

The present invention relates to electronic devices in general, and in particular to an electronic device having two chassis pivotably connected by a hinge mechanism.

BACKGROUND

In recent years, tablet type personal computers (tablet type PCs), each having a touch panel type liquid crystal display and having no physical keyboard, are becoming quite popular. Tablet type PCs are relatively convenient because they are easy to carry and data entry work can be performed by using a touch panel.

However, since a tablet type PC does not have a physical keyboard, certain tasks such as inputting long documents can be quite inconvenient. Accordingly, a compatible tablet type personal computer (compatible type PC) configured such that a display chassis that has a display has been made rotationally movable up to about 360 degrees exceeding about 180 degrees relative to a body chassis having a keyboard is a good alternative. Since a compatible type PC is configured to be used in two ways, that is, as a laptop personal computer and a tablet type PC, the compatible type PC tends to be more versatile.

SUMMARY

In accordance with one embodiment of the present disclosure, an electronic device includes a first chassis, a second chassis, a hinge mechanism, a cylindrical cam member, a slide member and a movable member. The first chassis is pivotally connected to the second chassis. The hinge mechanism has a first shaft connected to the first chassis, a second shaft connected to the second chassis, and a hinge chassis rotatably supporting the first shaft and the second shaft to pivotally connect the first chassis to the second chassis. The cylindrical cam member is disposed on an outer peripheral surface of the first shaft to allow the cylindrical cam member to be rotatable and coaxial with respect to the first shaft, which is rotatable integrally with the hinge chassis with respect to the first shaft, and which has a cam surface on an end surface thereof. The slide member has a cylindrical connecting section disposed on the outer peripheral surface of the first shaft to allow the slide member to be coaxial and movable in an axial direction with respect to the first shaft, which is provided movably in the axial direction with respect to the first chassis, and which has a pressure receiving surface that can be in slide contact with the cam surface, the pressure receiving surface being provided on an end surface of the cylindrical connecting section. The movable member moves in conjunction with a movement of the slide member in the axial direction and extends from and retracts to an outer surface of the first chassis.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
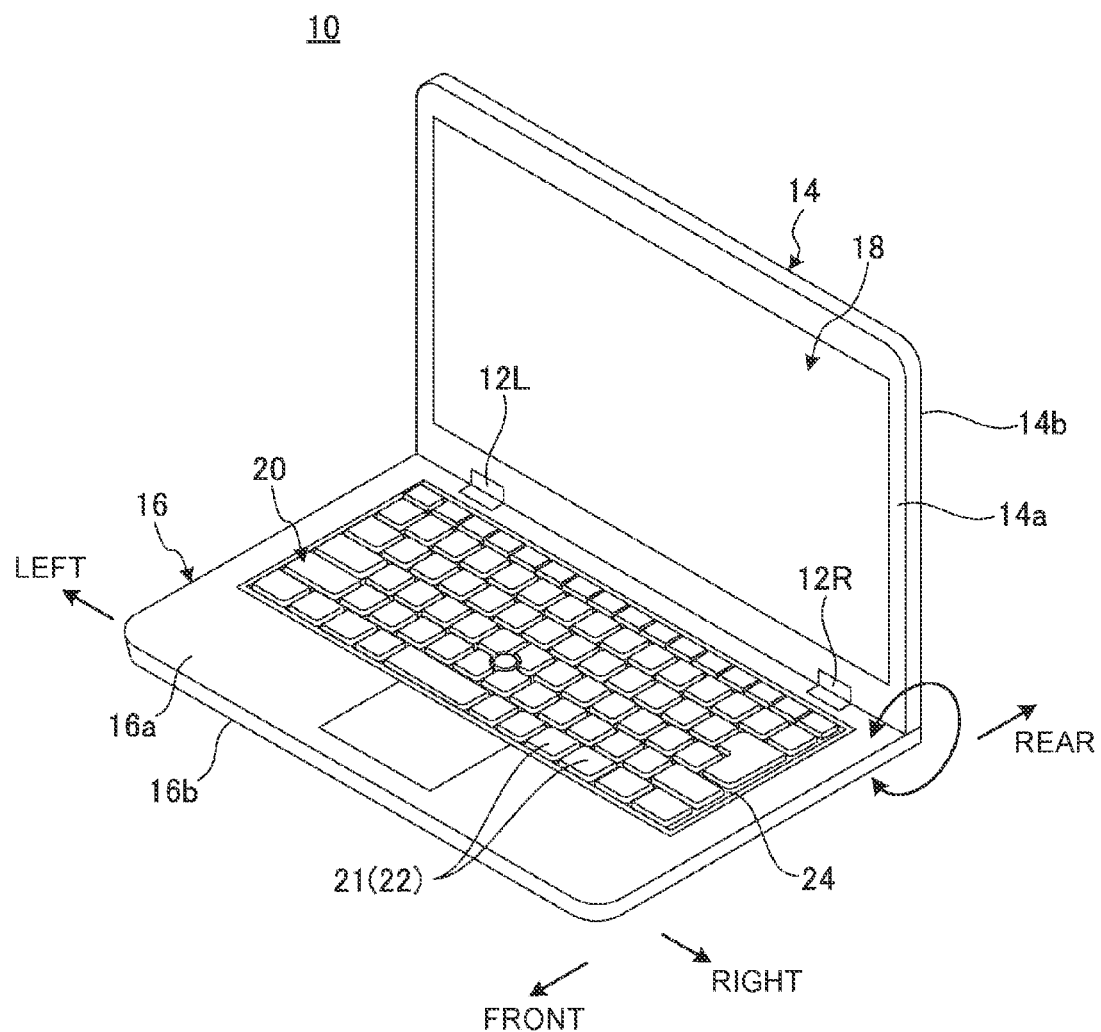
FIG. 1 is a perspective view of an electronic device.
Figure 2:
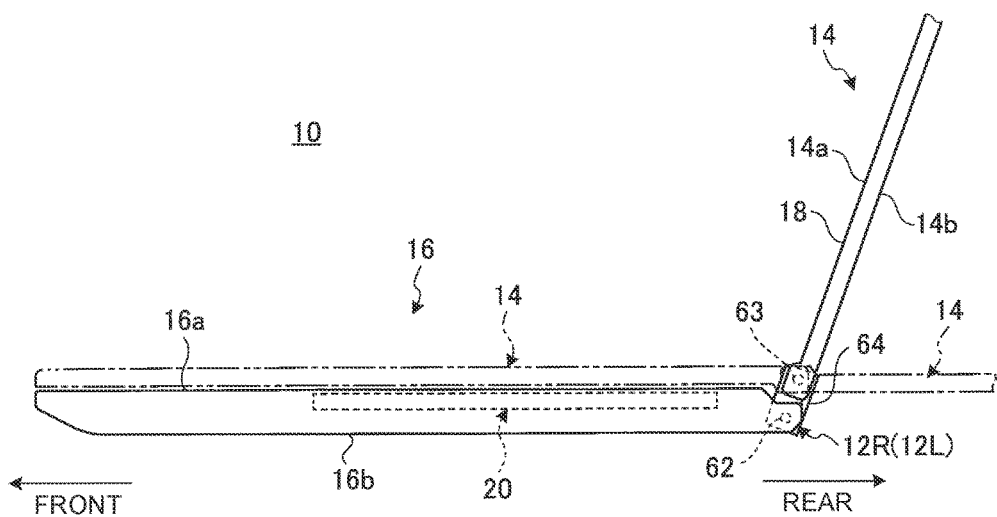
FIG. 2 is a side view of the electronic device illustrated in FIG. 1.
Figure 3:
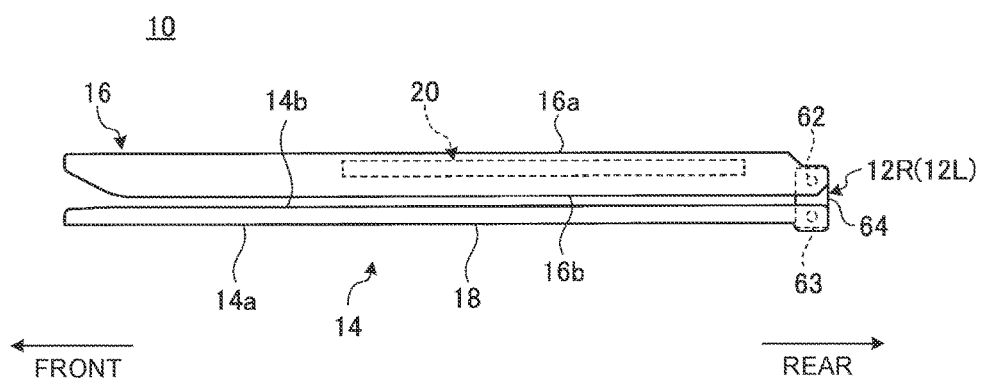
FIG. 3 is a side view of the electronic device used in the form of a tablet PC, in which a display chassis has been pivoted in an opening direction from the state illustrated in FIG. 2 to a 360-degree position.

FIG. 1 is a perspective view of an electronic device 10 according to the present disclosure. FIG. 1 illustrates an electronic device 10 used in the form of a laptop PC, in which a display chassis 14 has been opened from a main unit chassis 16 by hinge mechanisms 12L, 12R. FIG. 2 is a side view of the electronic device 10 illustrated in FIG. 1. FIG. 3 is a side view of the electronic device 10 used in the form of a tablet PC, in which the display chassis 14 has been pivoted in an opening direction to a 360-degree position from the state illustrated in FIG. 2.

The electronic device 10 according to the present disclosure is a convertible PC that can be used as a laptop PC and a tablet PC. The electronic device 10 can be ideally used as a laptop PC when the display chassis 14 is pivoted to an angle position of approximately 90 degrees to approximately 150 degrees with respect to the main unit chassis 16 (refer to FIG. 1 and FIG. 2). The electronic device 10 can be ideally used as a tablet PC when the display chassis 14 is pivoted to a 360-degree position with respect to the main unit chassis 16 (refer to FIG. 3). The contents of the present disclosure can be applied to various types of electronic devices, such as, for example, a cellular phone, a smartphone or an electronic organizer.

In the following description, using as a laptop PC illustrated in FIG. 1 and FIG. 2 will be defined as a standard form of use. As observed from a user who operates a keyboard assembly 20 while watching a display 18, the near side will be referred to as the front side, the far side will be referred to as the rear side, the direction of the thickness of the main unit chassis 16 will be referred to as the vertical direction, and the direction of the width thereof will be referred to as the lateral direction.

Regarding the angle position of the display chassis 14 with respect to the main unit chassis 16, when the display chassis 14 is completely closed with respect to the main unit chassis 16, and a surface of the display chassis 14 and a surface of the main unit chassis 16 (an inner surface 14a and an upper surface 16a), i.e. the display 18 and the keyboard assembly 20, face each other, this angle position will be referred to as the zero-degree position (refer to the display chassis 14 indicated by one of the two-dot chain lines in FIG. 2). With the zero-degree position defined as the reference, a description will be given of each angle in the direction in which the display chassis 14 is pivoted in an opening direction. For example, the angle position at which the display chassis 14 and the main unit chassis 16 are orthogonal to each other will be referred to as the 90-degree position. The angle position at which the inner surface 14a and the upper surface 16a are oriented in the same direction (upward) and parallel to each other will be referred to as the 180-degree position (refer to the display chassis 14 indicated by the other two-dot chain line in FIG. 2). The angle position at which the rear surface of the display chassis 14 and the rear surface of the main unit chassis 16, i.e. an outer surface 14b of the display chassis 14 and a lower surface 16b of the main unit chassis 16, face each other will be referred to as the 360-degree position (refer to FIG. 3). The angle positions denoted by the zero-degree position, the 180-degree position, the 360-degree position and the like may naturally deviate slightly from the accurate angle positions denoted by angle degree numbers, depending on the structures of the main unit chassis 16, display chassis 14 or the hinge mechanisms 12L, 12R.

As illustrated in FIG. 1 to FIG. 3, the electronic device 10 is provided with the display chassis (a second chassis) 14, which has the display 18, and the main unit chassis (a first chassis) 16, which has the keyboard assembly 20. The display chassis 14 and the main unit chassis 16 are connected by a pair of the left and right hinge mechanisms 12L, 12R (hereinafter referred to together as "the hinge mechanism 12" in some cases) such that the display chassis 14 and the main unit chassis 16 can be pivoted from the zero-degree position to the 360-degree position.

The display chassis 14 is electrically connected with the main unit chassis 16 by a cable (not illustrated), which passes through the hinge mechanism 12. The display 18 is composed of, for example, a touch-screen liquid crystal display.

The main unit chassis 16 is formed in a flat box shape and has the hinge mechanism 12 on a rear edge portion thereof. The main unit chassis 16 houses therein various types of electronic parts, such as boards, arithmetic units and memories (not illustrated). The keyboard assembly 20 is provided on the upper surface 16a of the main unit chassis 16.

The keyboard assembly 20 includes a plurality of key switches 21 arranged in vertical and horizontal directions and a frame 24, which fills in the gaps around key tops (movable members) 22 constituting the operation surfaces of the key switches 21. In the case of the present disclosure, the keyboard assembly 20 has an isolation configuration, in which the adjoining key tops 22 are defined by the frame 24, thus isolating each of the key tops 22.

The frame 24 is composed of a frame-shaped plate member having a plurality of holes 24a (refer to FIG. 5A and FIG. 5B) in which the key tops 22 of the key switches 21 are inserted. The frame 24 is installed to be substantially flush with or slightly lower than the upper surface 16a of the main unit chassis 16.

The keyboard assembly 20 is provided with a key depressing mechanism 26, which holds the key top 22 in a depressed position where the key top 22 is depressed downward to a level that is lower than the use position during a normal operation at the zero-degree position and the 360-degree position. Thus, the electronic device 10 has a thin structure that prevents the key tops 22 from projecting from the upper surface 16a of the main unit chassis 16 at the zero-degree position or the 360-degree position.

A specific configuration example of the keyboard assembly 20 will now be described.

Figure 4:
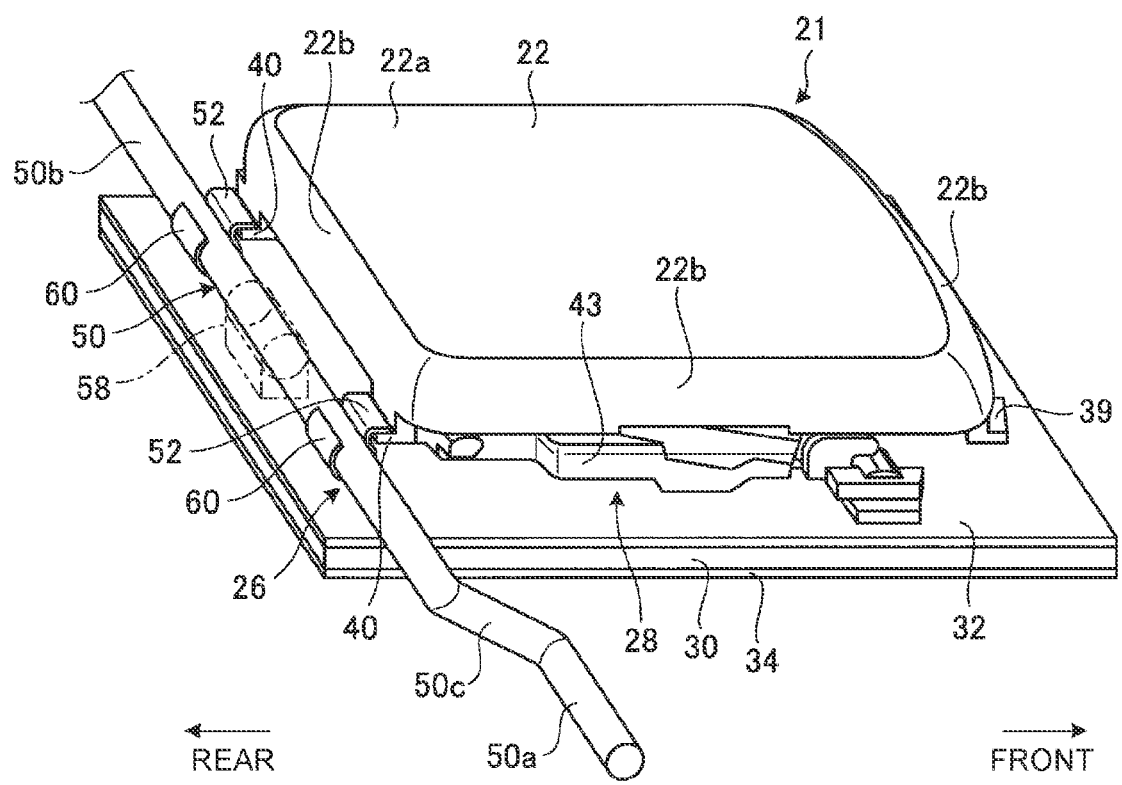
FIG. 4 is an enlarged perspective view of a key switch and its surrounding part of a keyboard assembly.
Figure 5A:
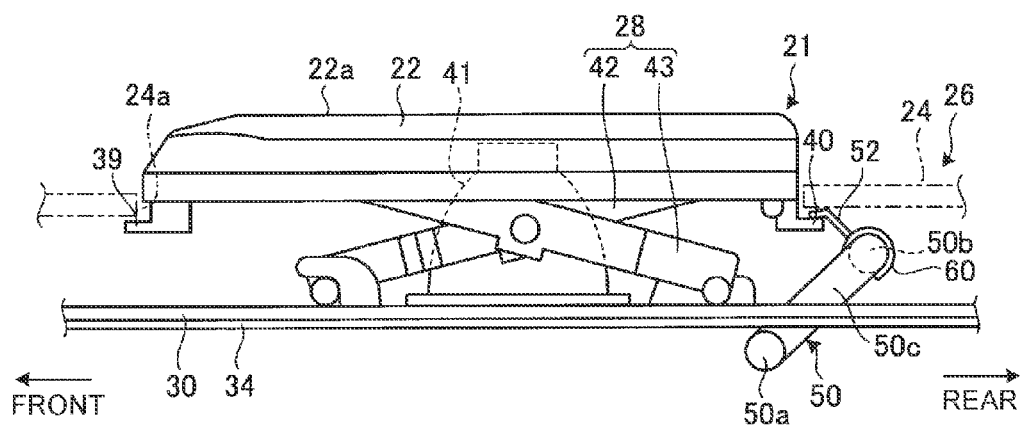
FIG. 5A is a side view of a key top in a use position, which is an uppermost position thereof.
Figure 5B:
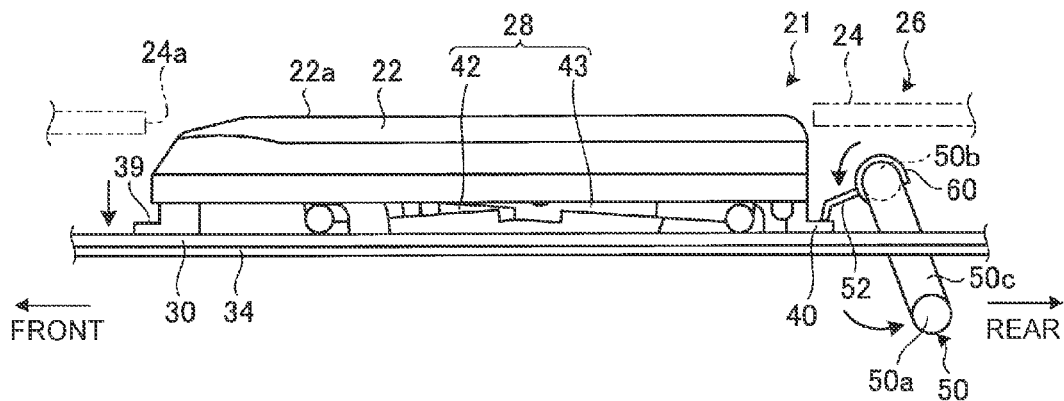
FIG. 5B is a side view illustrating the key top that has been depressed by a key depressing mechanism from the state illustrated in FIG. 5A to a depressed position, which is a lowermost position thereof.

FIG. 4 is an enlarged perspective view of one of the key switches 21 of the keyboard assembly 20 and the surrounding part thereof. FIG. 5A is a side view of the key top 22 positioned at the use position, which is the uppermost position thereof. FIG. 5B is a side view illustrating the key top 22 that has been depressed to a depressed position, which is a lowermost position thereof, by the key depressing mechanism 26 from the state illustrated in FIG. 5A.

As illustrated in FIG. 4, FIG. 5A and FIG. 5B, the keyboard assembly 20 has the key switches 21, each of which has the key top 22 supported by a guide mechanism 28 in a vertically movable manner, and a base plate 30, which supports the key switch 21 on the upper surface side thereof. A membrane sheet 32 is deposited on the upper surface of the base plate 30, and a waterproof sheet 34 is attached to the lower surface of the base plate 30. The membrane sheet 32 is omitted in FIG. 5A and FIG. 5B.

The base plate 30 formed by cutting and raising or punching a metal plate, such as a thin aluminum sheet, provides the plate for mounting the key switches 21 thereon. All the key switches 21 share the single base plate 30. The frame 24 is placed on the upper surface of the base plate 30.

The membrane sheet 32 is deposited on the base plate 30. The membrane sheet 32 is, for example, a two-layer sheet composed of a top layer and a bottom layer. The membrane sheet 32 has a comb-tooth switch pattern with which a rubber dome 41 having an electric conductor comes in contact, thereby forming a switch circuit. The membrane sheet 32 may alternatively be a three-layer switch sheet, in which a contact closes upon pressing. The membrane sheet 32 has through holes, through which the guide mechanisms 28 land on the upper surface of the base plate 30. The membrane sheet 32 may alternatively be deposited under the base plate 30.

Each of the key tops 22 is disposed above the base plate 30 through the intermediary of the guide mechanism 28. The key top 22 is an operation member for entering signals. The key top 22 is formed of a resin or the like and has a substantially square shape as observed in a planar view. The key top 22 has an upper surface 22a, which serves as an operation surface, and side surfaces 22b, which extend downward from the edges of the four sides of the upper surface 22a. The side surface 22b at the front has a pair of left and right projecting pieces 39, which are formed to project to the front. The side surface 22b at the rear has a pair of left and right receiving pieces 40, which are formed to project to the rear. The inner space of the key top 22 surrounded by the upper surface 22a and the side surfaces 22b provides a space in which the guide mechanism 28 and the rubber dome 41 are installed (refer to FIG. 5A). FIG. 5B omits illustrating the rubber dome 41.

The projecting pieces 39 project outward from the side surface 22b and are wing-like members having substantially rectangular shapes in a planar view. The projecting pieces 39 also function as the members for preventing the key top 22 from slipping off upward by coming in contact with the top surface of the frame 24. The projecting pieces 39 also function to restrict the maximum height position of the key top 22 in the upward movement.

The receiving pieces 40 project outward from the side surface 22b and are wing-like members having substantially rectangular shapes in a planar view. The receiving pieces 40 are members that receive a force for pressing the key top 22 downward applied by the key depressing mechanism 26. Together with the projecting pieces 39, the receiving pieces 40 function as the members for preventing the key top 22 from coming off upward and also function to restrict the maximum height position of the key top 22 in the upward movement.

The rubber dome 41 is an elastic member adapted to press the membrane sheet 32 when the key top 22 is depressed and to reset the key top 22 to its original position when the depressing operation of the key top 22 is cleared. The rubber dome 41 is disposed between the membrane sheet 32 and the key top 22. The key top 22 is elastically supported by the rubber dome 41 in a state in which the key top 22 is guided by the guide mechanism 28 in a vertically movable manner.

The rubber dome 41 is formed of an elastic material, such as a silicone rubber, which has flexibility.

In the key switch 21, when the key top 22 is operated to be depressed, the operating force causes the rubber dome 41 to elastically deform and the membrane sheet 32 to be pressed, and the membrane sheet 32 closes a contact. When the operation of depressing the key top 22 is cleared, the key top 22 returns to the original position (the use position) by the elastic restoring force of the rubber dome 41 and the membrane sheet 32 opens the contact.

The guide mechanism 28 is adapted to support the key top 22 in the vertically movable manner, and is foldably installed between the base plate 30 and the key top 22. The guide mechanism 28 in the present disclosure has a pantograph structure that includes an inner frame 42 and an outer frame 43, which are installed in a diagonal brace manner.

A description will now be given of a configuration example of the key depressing mechanism 26, which holds the key top 22 of each of the key switches 21 in a depressed position.

Figure 6:
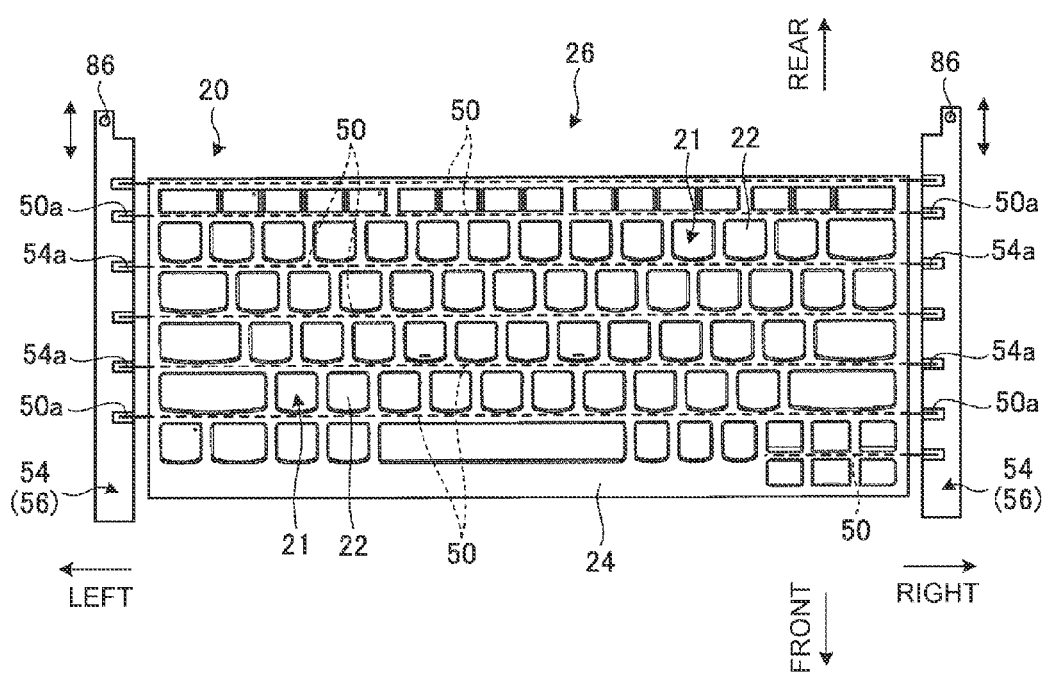
FIG. 6 is a plan view illustrating the configuration of the key depressing mechanism.

FIG. 6 is a plan view schematically illustrating the configuration of the key depressing mechanism 26. The key depressing mechanism 26 has rotating shaft members 50 and pressing pieces 52.

As illustrated in FIG. 4 to FIG. 6, a set of the rotating shaft members 50 are provided in the longitudinal direction of the keyboard assembly 20, extending along the rear portions of the key tops 22 arranged in the lateral direction of the keyboard assembly 20. Each of the rotating shaft members 50 is, for example, a hard wire rod (wire) made of a SUS material or the like, and exhibits sufficient rigidity even if the diameter thereof is, for example, approximately 1 mm.

On the lower surface side of the frame 24 of the keyboard assembly 20, the rotating shaft members 50 extend in the lateral direction of the keyboard assembly 20. Provided on the left and right ends of the rotating shaft members 50 are drive end sections 50a projecting from both left and right sides of the frame 24. The drive end sections 50a are rotatably engaged with slits 54a of Z sliders (second slide members) 54 provided on the left and right sides of the keyboard assembly 20. The Z sliders 54 constitute link mechanisms 56, which will be discussed hereinafter, and are slidable in the longitudinal direction on the left and right of keyboard assembly 20.

As illustrated in FIG. 4, FIG. 5A and FIG. 5B, each of the rotating shaft members 50 has a linear base section 50b extending in the lateral direction along the rear portions of the key tops 22, and the drive end sections 50a provided on both ends of the base section 50b. Each of the drive end sections 50a is formed by bending an end portion of the base section 50b by 90 degrees from the distal end of an arm section 50c bent by 90 degrees to project in the lateral direction so as to be parallel to the base section 50b. Thus, both ends of the rotating shaft member 50 are crank-shaped.

Each of the base sections 50b is rotatably positioned and supported, at an appropriate place in the lateral direction thereof, by a bearing 58 (refer to FIG. 4) provided on the base plate 30 or the frame 24. With this arrangement, as the left and right Z sliders 54 move in the longitudinal direction, the drive end sections 50a move in the longitudinal direction together with the Z sliders 54 while rotating in the slits 54a of the Z sliders 54. This causes the base sections 50b to rotate about their axes while the arm sections 50c swing about the base sections 50b, which are journaled by the bearings 58, in the longitudinal direction in a pendulum manner (refer to FIG. 5A and FIG. 5B).

Each of the pressing pieces 52 is formed by bending a mounting cylindrical member 60 fixed by external fitting to the outer peripheral surface of the base section 50b of the rotating shaft member 50. Thus, the pressing piece 52 projects toward the key top 22 from the outer peripheral surface of the base section 50b. The mounting cylindrical member 60 is firmly fixed to the base section 50b by swaging or spot welding. The pressing piece 52 is a plate piece projecting from the outer peripheral surface of the mounting cylindrical member 60. The pressing piece 52 is disposed in contact with the upper surface of the receiving piece 40 of the key top 22 and capable of pressing the receiving piece 40 downward.

In the key depressing mechanism 26, with the key tops 22 in the use position illustrated in FIG. 5A, if the left and right Z sliders 54 move backward and the drive end sections 50a move backward accordingly, then the base sections 50b rotate about the axes thereof. This causes the pressing pieces 52, which project from the outer peripheral surfaces of the base sections 50b, to swing downward to depress the receiving pieces 40 of the key tops 22, thereby forcibly depressing the key tops 22. As a result, the key tops 22 are held in the depressed position illustrated in FIG. 5B. At the depressed position, the upper surfaces 22a of the key tops 22 are positioned flush with or slightly lower than the upper surface of the frame 24, thus making the upper surface of the keyboard assembly 20 flat and level.

Meanwhile, with the key tops 22 in the depressed positions illustrated in FIG. 5B, if the left and right Z sliders 54 move forward, which is opposite from that in the depressing operation, then the base sections 50b also rotate in the opposite direction from that in the depressing operation. This causes the pressing pieces 52 to swing upward, thereby clearing the pressing on the receiving pieces 40. As a result, the key tops 22 are moved upward by the biasing force of the rubber domes 41 and returned to the use position illustrated in FIG. 5A.

The operation of depressing the key tops 22 by the key depressing mechanism 26 is performed in conjunction with the link mechanisms 56 through the link mechanism 56, and related to the pivot angle position of the display chassis 14.

A description will now be given of the configuration examples of the hinge mechanism 12 and the link mechanism 56, which interlock the pivoting operation of the display chassis 14 and the key depressing mechanism 26.

First, the configuration example of the hinge mechanism 12 will be described.

Figure 7:
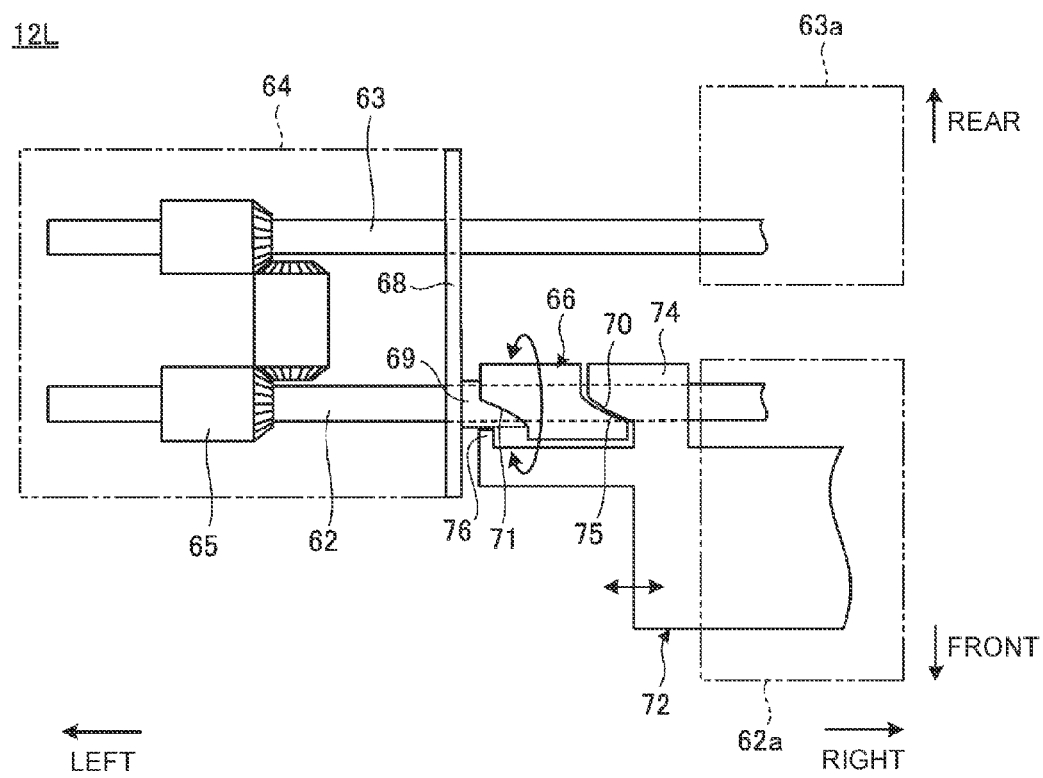
FIG. 7 is a plan view illustrating a configuration example of a hinge mechanism.

FIG. 7 is a plan view illustrating the configuration example of the hinge mechanism 12. In FIG. 7, the configuration of the left hinge mechanism 12L is representatively illustrated. In the following description, therefore, the left hinge mechanism 12L will be representatively described as the hinge mechanism 12. The right hinge mechanism 12R shares the same structure as the left hinge mechanism 12L except for being laterally symmetrical, and hence, a detailed description thereof will be omitted.

Referring to FIG. 7, the hinge mechanism 12 has a first shaft 62 extending in the lateral direction, a second shaft 63 installed in parallel to the first shaft 62, and a box-shaped hinge chassis 64, which rotatably supports and houses the first shaft 62 and the second shaft 63 (refer also to FIG. 2 and FIG. 3).

A mounting plate 62a fixed to one end of the first shaft 62 is fixed to the main unit chassis 16, so that the first shaft 62 rotates integrally with the main unit chassis 16. A mounting plate 63a fixed to one end of the second shaft 63 is fixed to the display chassis 14, so that the second shaft 63 rotates integrally with the display chassis 14. The other ends of the first shaft 62 and the second shaft 63 are rotatably supported in the hinge chassis 64. In the case of the present disclosure, the first shaft 62 and the second shaft 63 are configured to synchronously rotate through the intermediary of a gear train 65.

The first shaft 62 has a cylindrical cam member 66 coaxially disposed on the outer peripheral surface of an outer portion of the hinge chassis 64. The cylindrical cam member 66 is externally inserted to the outer peripheral surface of the first shaft 62 such that the cylindrical cam member 66 is rotatable with respect to the first shaft 62. The cylindrical cam member 66 is provided integrally with a support plate 68 fixed to one side of the hinge chassis 64. The support plate 68 is a plate-like member, which is provided integrally with the hinge chassis 64 and which has shaft holes in which the first shaft 62 and the second shaft 63 are rotatably inserted. The support plate 68 and the cylindrical cam member 66 are integrally connected by a bridge 69, which is rotatably and externally inserted to the first shaft 62. When the first shaft 62 and the hinge chassis 64 relatively rotate, the cylindrical cam member 66 relatively rotates together with the hinge chassis 64 as one piece with respect to the first shaft 62.

A first cam surface 70, the position of which in the axial direction changes along the circumferential direction, is provided on an end surface of one side (the right side in FIG. 7) of the cylindrical cam member 66. A second cam surface 71, the position of which in the axial direction changes along the circumferential direction, is provided on an end surface of the other side (the left side in FIG. 7) of the cylindrical cam member 66.

A cylindrical connecting section 74 of an X slider (slide member) 72 is coaxially disposed on the outer peripheral surface of a portion of the first shaft 62, the portion being adjacent to the cylindrical cam member 66. The X slider 72 is pressed by the cylindrical cam member 66, which rotates on the outer peripheral surface of the first shaft 62, and moved in the lateral direction. The X slider 72 is supported slidably in the lateral direction in the main unit chassis 16.

The cylindrical connecting section 74 is disposed adjacently to a portion on one end (right side in FIG. 7) of the cylindrical cam member 66. The cylindrical connecting section 74 is externally inserted to the outer peripheral surface of the first shaft 62 such that the cylindrical connecting section 74 is unrotatable with respect to the first shaft 62 and movable in the axial direction. The cylindrical connecting section 74 is provided with a pressure receiving surface 75 on an end surface thereof which opposes the first cam surface 70 of the cylindrical cam member 66. The pressure receiving surface 75 is a surface, the position of which in the axial direction changes along the circumferential direction and which can be in slide contact with the first cam surface 70 rotating on the outer peripheral surface of the first shaft 62. The first cam surface 70 and the pressure receiving surface 75 are required to coaxially rotate in smooth slide contact with each other. Hence, according to the present disclosure, the first cam surface 70 and the pressure receiving surface 75 are configured to have twisted shapes that are inclined in the rotational direction of mutual slide contact therebetween (refer to, for example, a first actuating surface 70a and a first pressure receiving surface 75a in FIG. 12A).

The X slider 72 has a pressure receiving projection (pressure receiving section) 76 at a position on the opposite side from the cylindrical connecting section 74, the cylindrical cam member 66 being located therebetween. The pressure receiving projection 76 is a pin-like member, which can be in slide contact with the second cam surface 71 rotating on the outer peripheral surface of the first shaft 62.

Figure 8A:
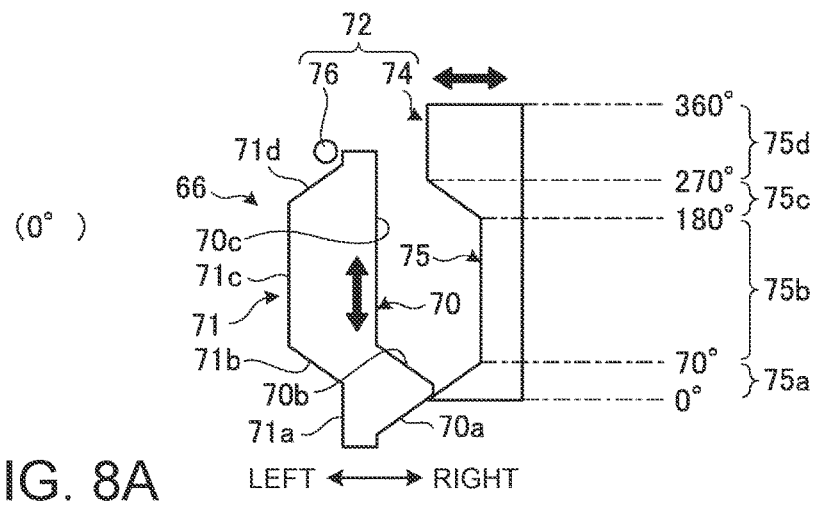
FIG. 8A is a development view illustrating a cylindrical cam member and a cylindrical connecting section of an X slider at a zero-degree position, which have been developed in a circumferential direction.
Figure 8B:
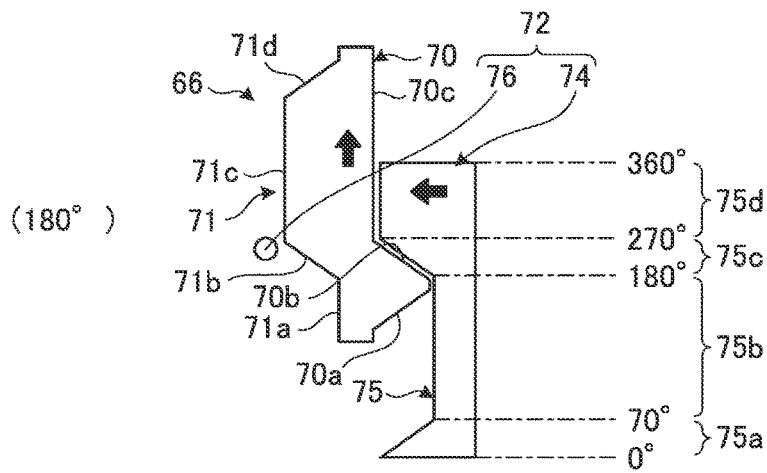
FIG. 8B is a development view illustrating the cylindrical cam member and the cylindrical connecting section of the X slider at a 180-degree position, which have been developed in the circumferential direction.
Figure 8C:
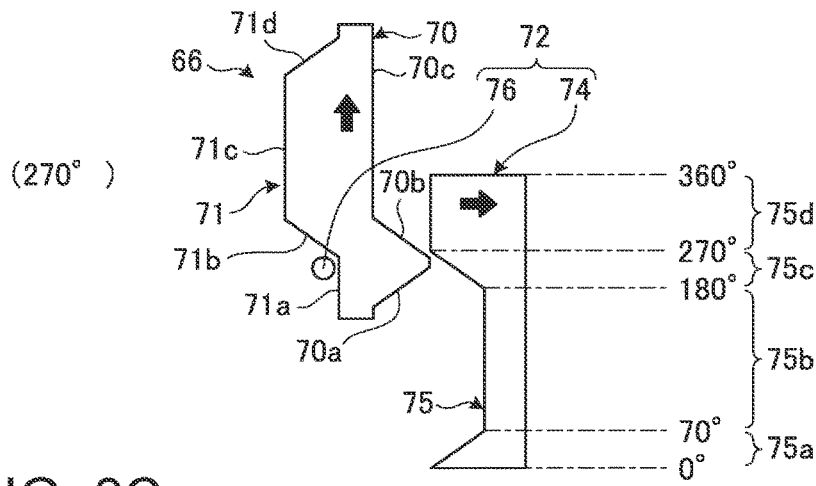
FIG. 8C is a development view illustrating the cylindrical cam member and the cylindrical connecting section of the X slider at a 270-degree position, which have been developed in the circumferential direction.

FIG. 8A to FIG. 8C are development views schematically illustrating the cylindrical cam member 66 and the cylindrical connecting section 74 of the X slider 72, which have been developed in a circumferential direction. FIG. 8A illustrates the positional relationship at the zero-degree position, FIG. 8B illustrates the positional relationship at the 180-degree position, and FIG. 8C illustrates the positional relationship at the 270-degree position.

As illustrated in FIG. 8A to FIG. 8C, the first cam surface 70 of the cylindrical cam member 66 has the first actuating surface 70a and a second actuating surface 70b, which are formed like drawing a hill-shaped convex portion that is spirally displaced in the axial direction (the lateral direction) along the circumferential direction, and a neutral surface 70c formed along the circumferential direction. The first actuating surface 70a is an inclined surface extending upslope from left to right in FIG. 8A. The second actuating surface 70b is an inclined surface extending upslope from right to left in FIG. 8A. The neutral surface 70c is a surface that extends along the circumferential direction with no displacement in the lateral direction.

The pressure receiving surface 75 of the cylindrical connecting section 74 is disposed, facing against the first cam surface 70 such that these surfaces can be in slide contact. The pressure receiving surface 75 has a first pressure receiving surface 75a, a first neutral surface 75b, and a second pressure receiving surface 75c, which are formed to draw a trapezoidal concave portion that is spirally displaced in the axial direction (the lateral direction) along the circumferential direction, and a second neutral surface 75d formed along the circumferential direction. The first pressure receiving surface 75a is an inclined surface extending upslope from left to right in FIG. 8A. The second pressure receiving surface 75c is an inclined surface extending upslope from right to left in FIG. 8A. The first neutral surface 75b and the second neutral surface 75d are surfaces that extend along the circumferential direction with no displacement in the lateral direction.

The second cam surface 71 of the cylindrical cam member 66 has a first neutral surface 71a formed along the circumferential direction, and a first actuating surface 71b, a second neutral surface 71c and a second actuating surface 71d, which are formed to draw a trapezoidal convex portion that is spirally displaced in the axial direction (the lateral direction) along the circumferential direction. The first actuating surface 71b is an inclined surface extending upslope from right to left in FIG. 8A. The second actuating surface 71d is an inclined surface extending upslope from left to right in FIG. 8A. The first neutral surface 71a and the second neutral surface 71c are surfaces that extend along the circumferential direction with no displacement in the lateral direction. A pressure receiving projection 76 is disposed, facing against the second cam surface 71 to enable slide contact therebetween.

In the first cam surface 70 and the pressure receiving surface 75, the first actuating surface 70a comes in slide contact with the first pressure receiving surface 75a in the range from the zero-degree position to the 70-degree position (refer to FIG. 8A). In the range from the 70-degree position to the 180-degree position, the apex between the first actuating surface 70a and the second actuating surface 70b comes in slide contact with the first neutral surface 75b (refer to FIG. 8B). Further, in the first cam surface 70 and the pressure receiving surface 75, the second actuating surface 70b comes in slide contact with the second pressure receiving surface 75c in the range from the 180-degree position to the 270-degree position (refer to FIG. 8C). In the range from the 270-degree position to the 360-degree position, the apex between the first actuating surface 70a and the second actuating surface 70b comes in slide contact with the second neutral surface 75d (refer to FIG. 8C).

In the second cam surface 71 and the pressure receiving projection 76, the second actuating surface 71d comes in slide contact with the pressure receiving projection 76 in the range from the zero-degree position to the 70-degree position (refer to FIG. 8A). In the range from the 70-degree position to the 180-degree position, the second neutral surface 71c comes in slide contact with the pressure receiving projection 76 (refer to FIG. 8B). Further, in the second cam surface 71 and the pressure receiving projection 76, the first actuating surface 71b comes in slide contact with the pressure receiving projection 76 in the range from the 180-degree position to the 270-degree position (refer to FIG. 8C). In the range from the 270-degree position to the 360-degree position, the first neutral surface 71a comes in slide contact with the pressure receiving projection 76 (refer to FIG. 8C).

A description will be given of a case where the display chassis 14 is pivoted open from the main unit chassis 16 through the intermediary of the hinge mechanism 12. In this case, the cylindrical cam member 66 rotating integrally with the hinge chassis 64, which pivots, relatively rotates with respect to the first shaft 62, the pressure receiving surface 75 and the pressure receiving projection 76 of the X slider 72, which cannot be rotated with the first shaft 62. As a result, in the range from the zero-degree position to the 70-degree position, the second actuating surface 71d of the second cam surface 71 of the cylindrical cam member 66, which moves upward in FIG. 8A, comes in slide contact with the pressure receiving projection 76, causing the X slider 72 to move to the left, as illustrated in FIG. 8B. In the range from the 70-degree position to the 180-degree position, the lateral position of the X slider 72 remains unchanged, as illustrated in FIG. 8B. In the range from the 180-degree position to the 270-degree position, the second actuating surface 70b of the first cam surface 70 of the cylindrical cam member 66, which moves upward in FIG. 8B, comes in slide contact with the second pressure receiving surface 75c of the pressure receiving surface 75, causing the X slider 72 to move to the right, as illustrated in FIG. 8C. In the range from the 270-degree position to the 360-degree position, the lateral position of the X slider 72 remains unchanged, as illustrated in FIG. 8C.

A description will now be given of a configuration example of the link mechanism 56, which interlocks the pivoting operation of the display chassis 14 by the hinge mechanism 12 and the operation of depressing the key tops 22 by the key depressing mechanism 26.

FIG. 9A, FIG. 10A, FIG. 11A, FIG. 12A and FIG. 13A are the perspective views of the hinge mechanism 12 (12L) and the link mechanism 56 at the zero-degree position, the 70-degree position, the 180-degree position, the 270-degree position, and the 360-degree position, respectively, observed from above. FIG. 9B, FIG. 10B, FIG. 11B, FIG. 12B and FIG. 13B are the perspective views of the hinge mechanism 12 (12L) and the link mechanism 56 at the zero-degree position, the 70-degree position, the 180-degree position, the 270-degree position, and the 360-degree position, respectively, observed from below.

The link mechanism 56 operates in the main unit chassis 16. As illustrated in FIG. 9B, the link mechanism 56 has the X slider 72, a first link 78, a second link 80, and the Z slider 54. In the present disclosure, the link mechanism 56 operates on the surface of the mounting plate 62a, which fixes the first shaft 62 and the main unit chassis 16 together.

The X slider 72 has the cylindrical connecting section 74 and the pressure receiving projection 76. The X slider 72 is a plate-like member that is pressed by the cylindrical cam member 66 thereby to move in the lateral direction, which is the axial direction of the first shaft 62, on the mounting plate 62a. When the display chassis 14 is pivoted and the cylindrical cam member 66 rotates together with the hinge chassis 64, the pressure receiving surface 75 of the cylindrical connecting section 74 or the pressure receiving projection 76 is pressed by the first cam surface 70 or the second cam surface 71 of the cylindrical cam member 66, causing the X slider 72 to slide in the lateral direction.

The first link 78 is a thin plate-like bar member. The first link 78 has one end thereof rotatably connected with the X slider 72 by a connecting shaft 82. The first link 78 has the other end thereof rotatably connected with the second link 80 by a connecting shaft 84.

The second link 80 is an L-shaped, plate-like member. The end of the short portion of the L-shape of the second link 80 is rotatably connected with the first link 78 by the connecting shaft 84. The end of the long portion of the L-shape of the second link 80 is rotatably connected with the rear end of the Z slider 54 by a connecting shaft 86. The angular portion of the L-shape of the second link 80 is rotatably supported by a rotating shaft 88 with respect to the main unit chassis 16 (the mounting plate 62a in the present disclosure).

The Z slider 54 is a long rectangular plate-like member provided to be slidable in the longitudinal direction with respect to the main unit chassis 16 by a guide structure (not illustrated). The rear end of the Z slider 54 is rotatably connected with the second link 80 by the connecting shaft 86.

In the link mechanism 56, when the display chassis 14 is pivoted with respect to the main unit chassis 16, the cylindrical cam member 66 rotates, and the X slider 72 slides in the lateral direction, the first link 78 is pulled by the X slider 72 through the connecting shaft 82. This causes the first link 78 to pivot about the connecting shaft 84. The pivoting of the first link 78 about the connecting shaft 84 in turn causes the second link 80 to be pulled by the first link 78 through the connecting shaft 84. This causes the second link 80 to pivot about the rotating shaft 88. As a result, the Z slider 54 moves in the longitudinal direction, with the connecting shaft 86, which moves in the longitudinal direction, serving as the point of action (refer to FIG. 9B and FIG. 10B).

A description will now be given of the relationship between the pivoting operation of the display chassis 14 and the operation of the key depressing mechanism 26, which are interlocked by the link mechanism 56.

Figure 9A:
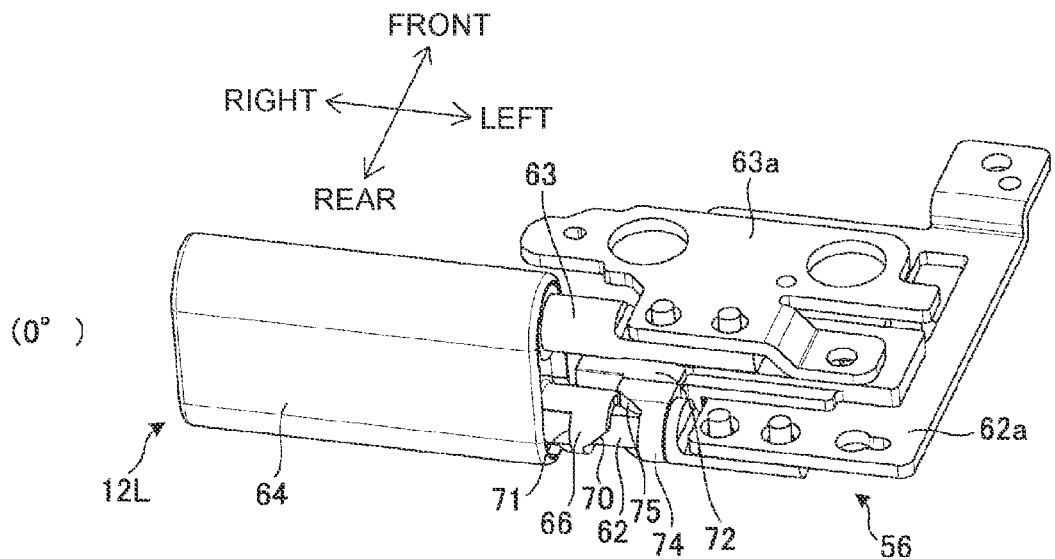
FIG. 9A is a perspective view of the hinge mechanism and a link mechanism at the zero-degree position observed from above.
Figure 9B:
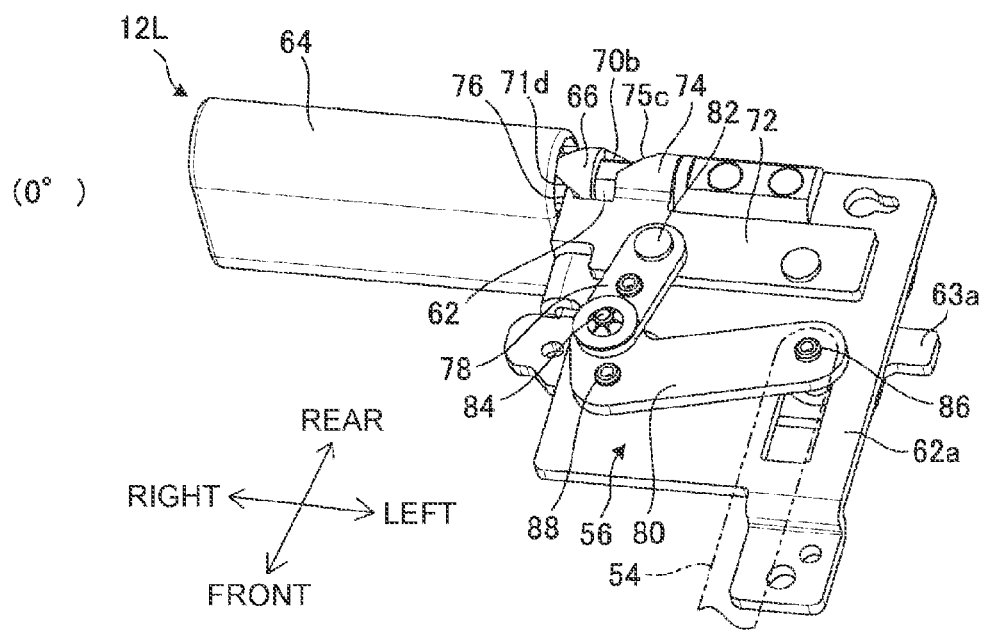
FIG. 9B is a perspective view of the hinge mechanism and the link mechanism at the zero-degree position observed from below.

First, when the display chassis 14 is in the zero-degree position, the X slider 72 is in a position that is farthest away from the cylindrical cam member 66 (the rightmost position in FIG. 9B), as illustrated in FIG. 9A and FIG. 9B. Therefore, the second link 80 is in the position where the second link 80 has pivoted fully counterclockwise in FIG. 9B, and the Z slider 54 is in the position where the Z slider 54 has moved to a rearmost position. At this time, the pressure receiving projection 76 of the X slider 72 is positioned at the start point of the second actuating surface 71d of the second cam surface 71 of the cylindrical cam member 66 (refer to FIG. 8A and FIG. 9B).

In this state, the drive end sections 50a of the rotating shaft member 50 are located at the rearmost position by having been moved by the Z slider 54, and the receiving pieces 40 of the key tops 22 are held in a deepest depressed position by having been depressed by the pressing pieces 52, as illustrated in FIG. 5B. Hence, the upper surfaces 22a of the key tops 22 are in the position flush with or slightly lower than the upper surface of the frame 24. The upper surface of the keyboard assembly 20 is configured on a plane. Therefore, the thickness of the electronic device 10 is controlled to a minimum possible thickness without causing the display chassis 14, when closed with respect to the main unit chassis 16, to interfere with the key tops 22.

Then, as the display chassis 14 is pivoted in the opening direction from the zero-degree position, the hinge chassis 64 of the hinge mechanism 12 also pivots, and the cylindrical cam member 66 rotates on the outer peripheral surface of the first shaft 62. In the range from the zero-degree position to the 70-degree position, the second actuating surface 71d of the second cam surface 71 comes in slide contact with the pressure receiving projection 76 and presses the pressure receiving projection 76 at the same time (refer to FIG. 8A and FIG. 8B), thus moving the X slider 72 in the direction for approaching the cylindrical cam member 66 (to the left in FIG. 9B). The first actuating surface 70a of the first cam surface 70 comes in slide contact with the first pressure receiving surface 75a of the cylindrical connecting section 74 of the X slider 72. Thus, the second link 80 pivots clockwise in FIG. 9B, causing the Z slider 54 to move to the front.

When the Z slider 54 moves to the front, the drive end sections 50a of the rotating shaft member 50 also move to the front, so that the rotating shaft member 50 rotates in a direction for the pressing pieces 52 to move upward (refer to FIG. 5A). This clears the pressing on the receiving pieces 40 by the pressing pieces 52, thus causing the key tops 22 to move upward together with the pressing pieces 52 by the biasing forces of the rubber domes 41.

Figure 10A:
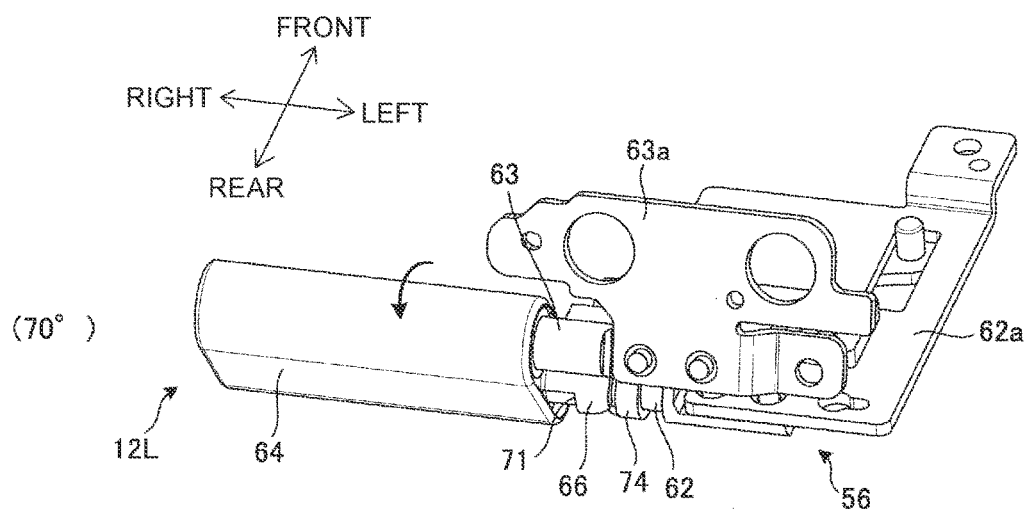
FIG. 10A is a perspective view of the hinge mechanism and the link mechanism at a 70-degree position observed from above.
Figure 10B:
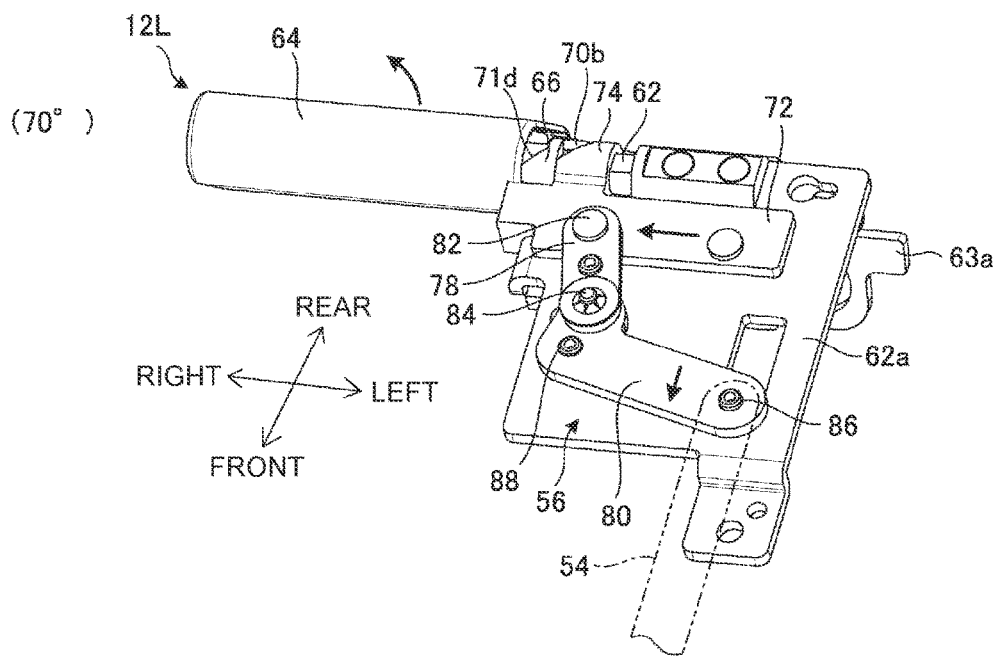
FIG. 10B is a perspective view of the hinge mechanism and the link mechanism at the 70-degree position observed from below.

At the 70-degree position, the X slider 72 is at a position closest to the cylindrical cam member 66 (the leftmost position in FIG. 10B), as illustrated in FIG. 10A and FIG. 10B. Hence, the second link 80 reaches a fully pivoted clockwise position in FIG. 10B, and the Z slider 54 reaches a frontmost position.

In this state, the drive end sections 50a of the rotating shaft member 50 are located in the frontmost position by having been moved by the Z slider 54 and the key tops 22 are in the use position, which is the uppermost position thereof, as illustrated in FIG. 5A. Further, the pressing pieces 52 at the uppermost position thereof define the maximum height position of the receiving pieces 40. In the electronic device 10, therefore, when the display chassis 14 is pivoted open to the 70-degree position, the key tops 22 will project upward from the upper surface of the frame 24 to reach the use position, thus making the keyboard assembly 20 ready for use.

In the range from the 70-degree position to the 180-degree position, the apex of the first actuating surface 70a and the second actuating surface 70b, the apex being the projecting portion of the first cam surface 70 of the cylindrical cam member 66, is positioned on the first neutral surface 75b of the pressure receiving surface 75 of the X slider 72, as illustrated in FIG. 8B. The pressure receiving projection 76 is positioned at the second neutral surface 71c of the second cam surface 71. Hence, when the hinge chassis 64 pivots and the cylindrical cam member 66 rotates, the X slider 72 does not slide in the lateral direction. Therefore, the position of the Z slider 54 remains unchanged (refer to FIG. 11A and FIG. 11B), so that the key tops 22 are maintained at the use position, as illustrated in FIG. 5A. This means that, in the electronic device 10, the keyboard assembly 20 is maintained in an available state in the range from the 70-degree position to the 180-degree position, in which the electronic device 10 is expected to be used as the laptop PC.

Figure 11A:
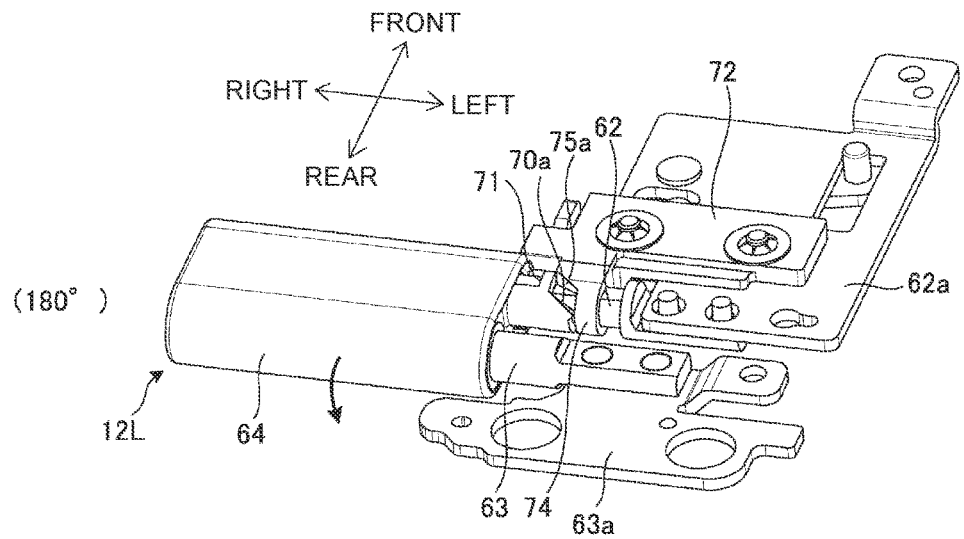
FIG. 11A is a perspective view of the hinge mechanism and the link mechanism at a 180-degree position observed from above.
Figure 11B:
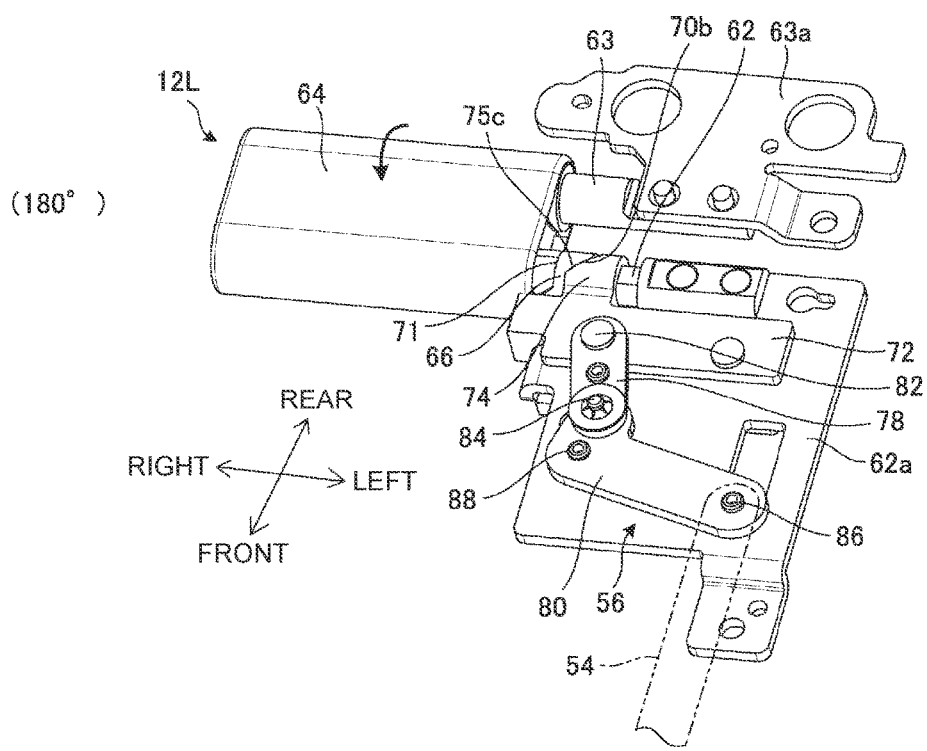
FIG. 11B is a perspective view of the hinge mechanism and the link mechanism at the 180-degree position observed from below.

In the range from the 180-degree position to the 270-degree position, the second actuating surface 70b of the first cam surface 70 of the cylindrical cam member 66 presses the second pressure receiving surface 75c of the pressure receiving surface 75 of the X slider 72 while being in slide contact with the second pressure receiving surface 75c, as illustrated in FIG. 8C, thus pushing the X slider 72 out in the direction away from the cylindrical cam member 66 (to the right in FIG. 11B). The pressure receiving projection 76 comes in slide contact with the first actuating surface 71b of the second cam surface 71. Thus, the second link 80 pivots counterclockwise in FIG. 11B and the Z slider 54 moves to the rear.

When the Z slider 54 moves to the rear, the drive end section 50a of the rotating shaft member 50 also moves to the rear, so that the rotating shaft member 50 rotates in the direction in which the pressing pieces 52 move downward (refer to FIG. 5B). As a result, the receiving pieces 40 are pressed by the pressing pieces 52, causing the key tops 22 to move downward together with the pressing pieces 52 against the biasing forces of the rubber domes 41.

Figure 12A:
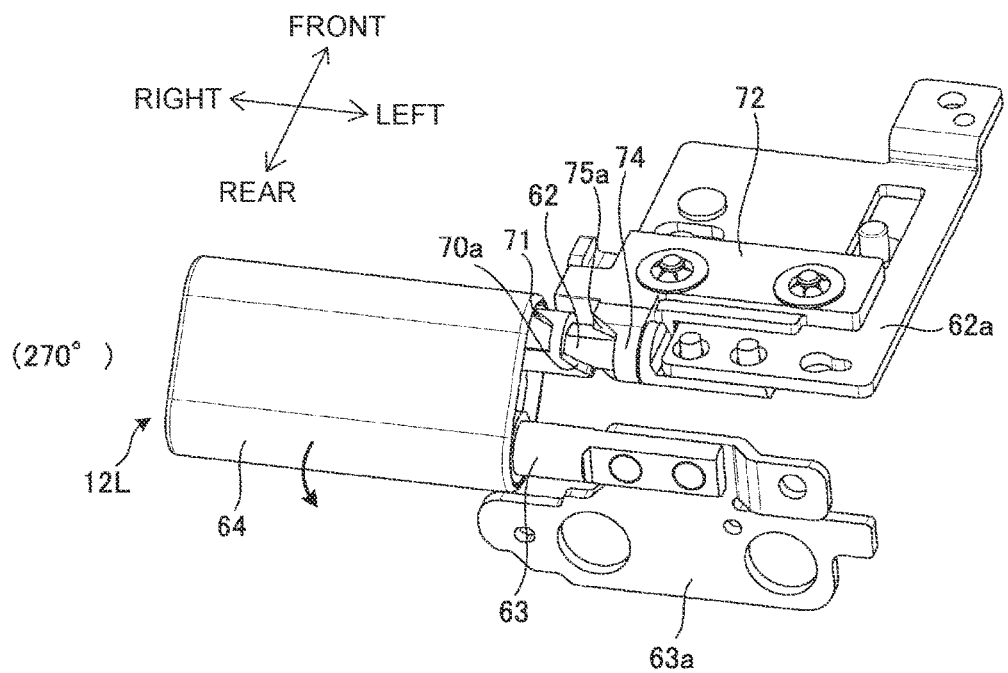
FIG. 12A is a perspective view of the hinge mechanism and the link mechanism is a 270-degree position observed from above.
Figure 12B:
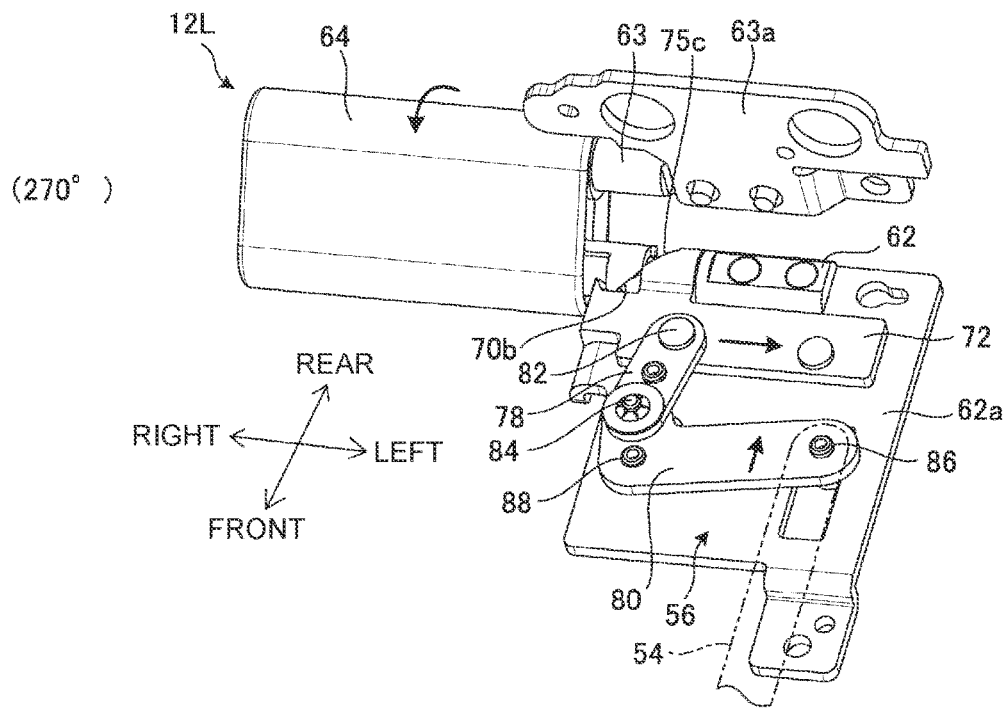
FIG. 12B is a perspective view of the hinge mechanism and the link mechanism at the 270-degree position observed from below.
Figure 13A:
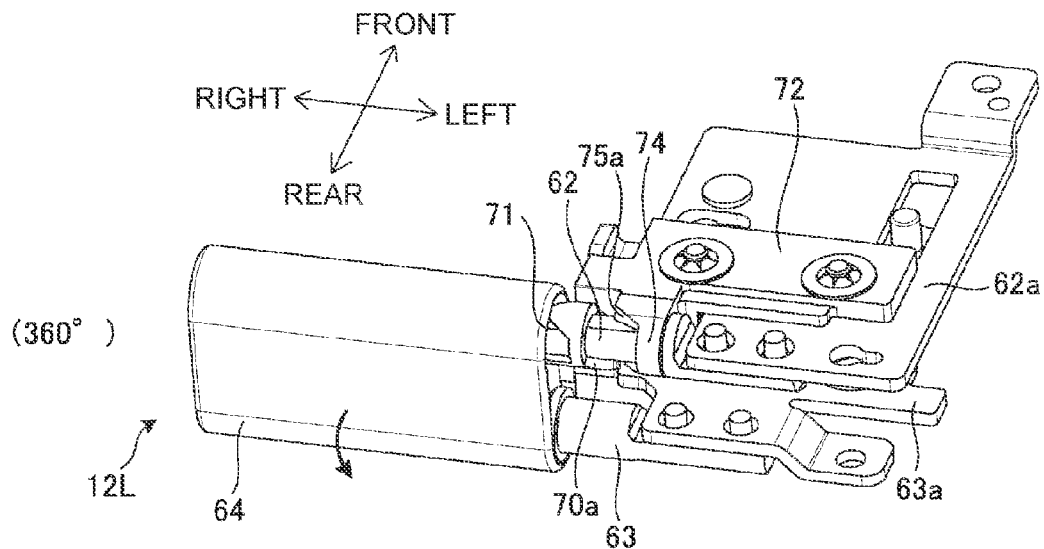
FIG. 13A is a perspective view of the hinge mechanism and the link mechanism at a 360-degree position observed from above.
Figure 13B:
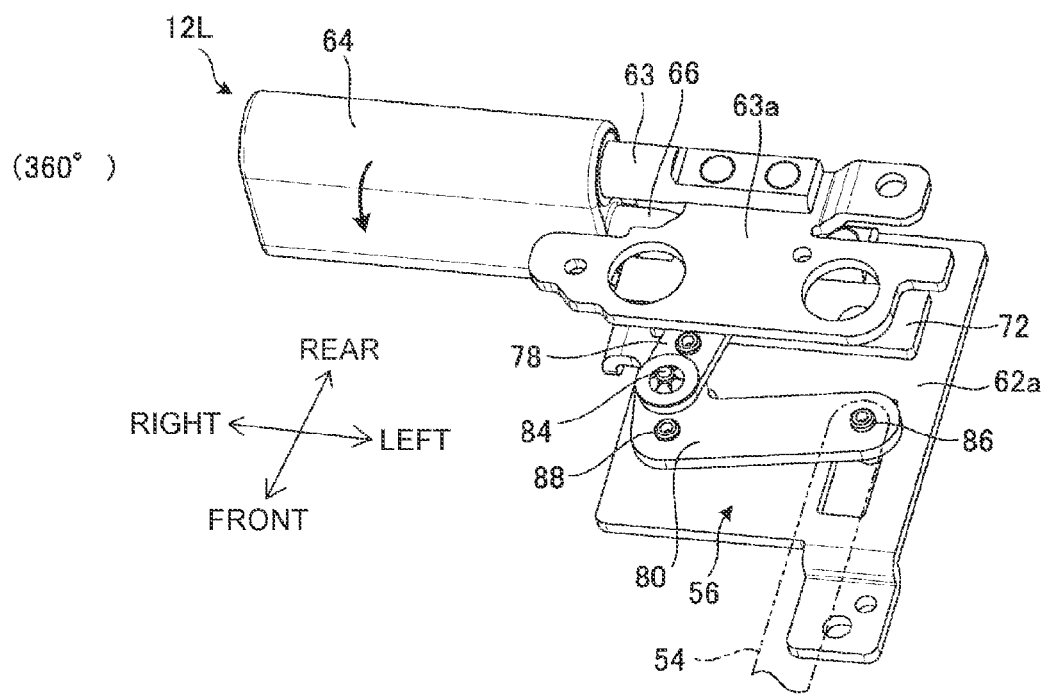
FIG. 13B is a perspective view of the hinge mechanism and the link mechanism at the 360-degree position observed from below.

At the 270-degree position, the X slider 72 is in the farthest position from the cylindrical cam member 66 (rightmost position in FIG. 12B), as illustrated in FIG. 12A and FIG. 12B. Hence, the second link 80 reaches a position where the second link 80 has pivoted fully counterclockwise in FIG. 12B, and the Z slider 54 reaches a rearmost position.

In this state, as with the case of the zero-degree position, the drive end sections 50a of the rotating shaft member 50 are in the positions where the drive end sections 50a have been moved to the rearmost position by the Z slider 54, as illustrated in FIG. 5B. The key tops 22 are held in the depressed position where the receiving pieces 40 have been depressed by the pressing pieces 52. Therefore, the upper surfaces 22a of the key tops 22 are in the position flush with or slightly lower than the upper surface of the frame 24, and the upper surface of the keyboard assembly 20 is configured on a plane.

In the range from the 270-degree position to the 360-degree position, the apex between the first actuating surface 70a and the second actuating surface 70b, which form the projecting portion of the first cam surface 70 of the cylindrical cam member 66, is positioned at the second neutral surface 75d of the pressure receiving surface 75 of the X slider 72, as illustrated in FIG. 8C. The pressure receiving projection 76 is positioned at the first neutral surface 71a of the second cam surface 71. Therefore, even when the hinge chassis 64 pivots and the cylindrical cam member 66 rotates, the X slider 72 does not slide in the lateral direction. Thus, the position of the Z slider 54 remains unchanged (refer to FIG. 13A and FIG. 13B), so that the key tops 22 are maintained in the depressed position, as illustrated in FIG. 5B. Accordingly, the upper surface 16a of the main unit chassis 16, which becomes the rear surface in the tablet PC mode, is configured to be a flat plate that does not have irregularities attributable to the key tops 22. This prevents the keyboard assembly 20 from being in the way when the electronic device 10 is used as the tablet PC.

Meanwhile, when the display chassis 14 in the 360-degree position is pivoted in the closing direction, an operation that reverses the operation of pivoting in the opening direction described above is performed. More specifically, as the display chassis 14 is pivoted from the 360-degree position to the 180-degree position via the 270-degree position, the first actuating surface 71b of the second cam surface 71 presses the pressure receiving projection 76 while coming in slide contact with the pressure receiving projection 76. Hence, the X slider 72 is moved in the direction to approach the cylindrical cam member 66. This causes the second link 80 to pivot clockwise in FIG. 12B and the Z slider 54 to move toward the front. The key tops 22 are restored to the use position, which is the uppermost position.

In the range from the 180-degree position to the 70-degree position, the key tops 22 are maintained in the use position. Then, as the display chassis 14 is pivoted from the 70-degree position to the zero-degree position, the first actuating surface 70a of the first cam surface 70 presses the first pressure receiving surface 75a of the pressure receiving surface 75 while coming in slide contact with the first pressure receiving surface 75a. Therefore, the X slider 72 is moved by being pushed out in the direction away from the cylindrical cam member 66. The Z slider 54 moves to the rear, causing the rotating shaft member 50 to rotate in the direction in which the pressing pieces 52 push the receiving pieces 40 down. As a result, each of the key tops 22 reaches the position flush with or slightly lower than the upper surface of the frame 24, thus enabling the display chassis 14 to be closed without causing interference between the display 18 and the key tops 22.

As described above, the electronic device 10 according to the present disclosure includes: the cylindrical cam member 66, which is coaxially disposed on the outer peripheral surface of the first shaft 62 so as to be rotatable with respect to the first shaft 62, rotatable integrally with the hinge chassis 64 with respect to the first shaft 62, and which has the first cam surface 70 on its end surface; the X slider 72, which has the cylindrical connecting section 74 coaxially disposed on the outer peripheral surface of the first shaft 62 so as to be unrotatable with respect to the first shaft 62 and movable in the axial direction, which is provided to be movable in the axial direction with respect to the main unit chassis 16, and which is provided with the pressure receiving surface 75, which can be in slide contact with the first cam surface 70, on the end surface of the cylindrical connecting section 74; and the key tops 22, which are movable members, which move in conjunction with the movement of the X slider 72 in the axial direction and which extend from and retract to the outer surface of the main unit chassis 16.

Thus, when opening or closing the display chassis 14 with respect to the main unit chassis 16, the X slider 72 is moved by the cylindrical cam member 66, making it possible to set the key tops 22, which are the movable members, to the use position or the depressed position. At this time, to depress the key tops 22 to the depressed position, a plurality of the key tops 22 must be depressed to the depressed position against the biasing forces of the rubber domes 41. This means that a high load is applied between the first cam surface 70 of the cylindrical cam member 66 and the pressure receiving surface 75 of the X slider 72. However, the electronic device 10 according to the present disclosure has the configuration in which the cylindrical cam member 66 and the cylindrical connecting section 74 of the X slider 72 are coaxially disposed on the outer peripheral surface of the first shaft 62 so as to transmit the load by the first cam surface 70 and the pressure receiving surface 75, which are provided on the end surfaces of these coaxially disposed components. This arrangement makes it possible to secure an adequate area of contact between the first cam surface 70 and the pressure receiving surface 75, thus preventing wear on or damage to the both surfaces. Further, even if the first shaft 62 is configured to have an extremely small diameter, an adequate area of contact between the first cam surface 70 and the pressure receiving surface 75 can be secured, thus achieving the compact device configuration.

In the present disclosure, the cylindrical cam member 66 has the second cam surface 71 on the end surface on the opposite side in the axial direction from the end surface where the first cam surface 70 is provided, and the X slider 72 has the pressure receiving projection 76, which is the pressure receiving section that can be in slide contact with the second cam surface 71. Hence, the X slider 72 can be slid to one side with the pressing force by the first cam surface 70 and the X slider 72 can be slid toward the other side with the pressing force by the second cam surface 71. Further, the X slider 72 is slid by the first cam surface 70 and the second cam surface 71 provided on both end surfaces of the cylindrical cam member 66, thus preventing the X slider 72 from shaking. The direction in which the X slider 72 is moved by the second cam surface 71 and the pressure receiving projection 76 is the direction for releasing the key top 22 from the depressed position to the use position. In this direction, the biasing force from the rubber dome 41 is applied, so that the load between the second cam surface 71 and the pressure receiving projection 76 is smaller than the load between the first cam surface 70 and the pressure receiving surface 75. Therefore, in the structure of the slide contact between the second cam surface 71 and the pressure receiving projection 76 according to the present disclosure, the pressure receiving projection 76 shaped like a pin is abutted sideways against the second cam surface 71, thus achieving the simplified structure. Alternatively, the structure in which the coaxial end surfaces come in slide contact, as with the case of the second cam surface 71 and the pressure receiving projection 76, may be applied to the second cam surface 71 and the pressure receiving projection 76.

In the present disclosure, the X slider 72 is adapted to move to one side in the axial direction when the pressure receiving surface 75 of the cylindrical connecting section 74 is pressed by the first cam surface 70 of the cylindrical cam member 66, which rotates on the outer peripheral surface of the first shaft 62. The rubber domes 41 are provided, which are elastic members that bias the X slider 72 in the direction to move to the other side in the axial direction by biasing the key tops 22, which are movable members, in the direction to extend from or retract to the outer surface of the main unit chassis 16. Accordingly, the biasing forces transmitted from the rubber domes 41 can be used to move the X slider 72 to the other side. Further, the shaking of the X slider 72 in the axial direction is also prevented.

Figure 14:
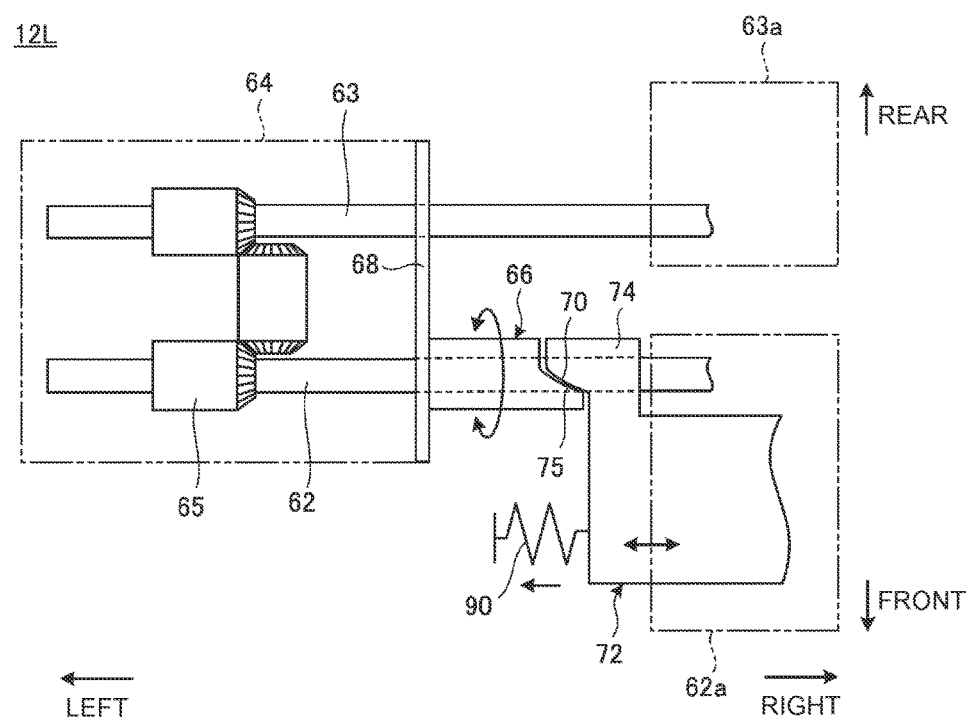
FIG. 14 is a plan view schematically illustrating a configuration example of a hinge mechanism according to a modification example.
Figure 15:
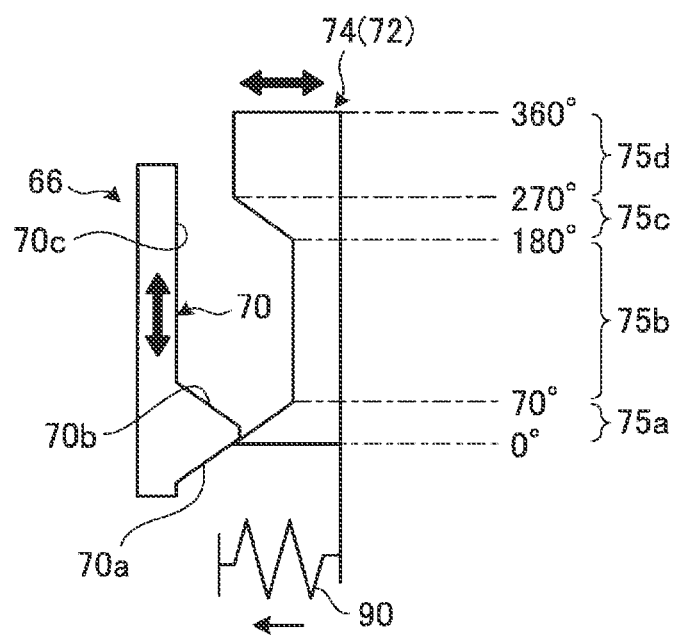
FIG. 15 is a development view schematically illustrating a cylindrical cam member and a cylindrical connecting section of an X slider in the hinge mechanism illustrated in FIG. 14, which have been developed in the circumferential direction.

The X slider 72 can be moved in the direction toward the cylindrical cam member 66 by the biasing forces of the rubber domes 41, so that the second cam surface 71 may be omitted. More specifically, the rotating shaft member 50 is constantly biased in the direction for moving to the front by the elastic forces of the rubber domes 41, and the Z slider 54 is also subjected to the biasing forces in the direction for moving to the front. Hence, the X slider 72 is constantly subjected to the biasing force in the direction for approaching the cylindrical cam member 66 through the intermediary of the second link 80 and the first link 78. Thus, the second cam surface 71 and the pressure receiving projection 76, which pull the X slider 72 toward the cylindrical cam member 66, can be omitted. An elastic member 90, which pulls the X slider 72 in the direction for approaching the cylindrical cam member 66, may be provided, as illustrated in FIG. 14 and FIG. 15. This makes it possible to prevent the X slider 72 from shaking thereby to ensure a smooth slide thereof even in the case where the second cam surface 71 and the pressure receiving projection 76 are omitted.

The present disclosure has illustrated the configuration in which the key tops 22 are in the depressed position in the range from the zero-degree position to the 70-degree position and in the range from the 180-degree position to the 360-degree position, and the key tops 22 are in the use position in the range from the 70-degree position to the 180-degree position. The relationship between the height positions of the key tops 22 and the pivoting position of the display chassis 14 may of course be changed.

In the present disclosure, the key tops 22 have been illustrated as the movable members interlocked with the slide of the X slider 72 and the Z slider 54. Other than the key tops 22, the movable member may alternatively be, for example, a movable rubber leg extending from and retracting to the upper surface 16a or the lower surface 16b of the main unit chassis 16, a pointing stick or various types of function buttons, such as a power button.

Further, the elastic members, such as the rubber domes 41, which bias the movable members, may be configured to bias the movable members in either the extending direction to extend from the outer surface of the main unit chassis 16 or the retracting direction to retract thereto.

As has been described, the present invention provides an electronic device having two chassis pivotably connected by a hinge mechanism.

While the invention has been particularly shown and described with reference to a preferred embodiment, it will be understood by those skilled in the art that various changes in form and detail may be made therein without departing from the spirit and scope of the invention.

What is claimed is:

1. An electronic device comprising: a first chassis; a second chassis pivotably connected with said first chassis; a hinge mechanism having a first shaft, a second shaft and a hinge chassis, wherein said first shaft is connected to said first chassis, said second shaft is connected to said second chassis, and said hinge chassis rotatably supports said first and second shafts to pivotably connect said first chassis and said second chassis; a cylindrical cam member disposed on an outer peripheral surface of said first shaft to allow said cylindrical cam member to be rotatable and coaxial with respect to said first shaft, which is rotatable integrally with said hinge chassis with respect to said first shaft, and which has a cam surface on an end surface thereof, a slide member having a cylindrical connecting section disposed on an outer peripheral surface of said first shaft such that said slide member is coaxial and movable in an axial direction with respect to said first shaft, which is provided movably in said axial direction with respect to said first chassis, and which has a pressure receiving surface that is in slide contact with said cam surface, wherein said pressure receiving surface being provided on an end surface of said cylindrical connecting section; and a movable member moves in conjunction with a movement of said slide member in said axial direction and which extends from and retracts to an outer surface of said first chassis; wherein said cylindrical cam member includes a second cam surface on an end surface thereof on an opposite side in said axial direction from said end surface on which said cam surface is provided, and said slide member includes a pressure receiving section that is in slide contact with the said second cam surface.

2. The electronic device of claim 1, wherein said slide member moves to one side in said axial direction by a pressure receiving surface of said cylindrical connecting section being pressed by said cam surface of said cylindrical cam member, which rotates on said outer peripheral surface of said first shaft.

3. The electronic device of claim 2, wherein said electronic device further includes an elastic member that biases said slide member to another side in said axial direction.

4. The electronic device of claim 2, wherein said electronic device further includes an elastic member that biases said movable member in a direction for extending from an outer surface of said first chassis in order to bias said slide member in a direction for moving said slide member to another side in said axial direction.

5. The electronic device of claim 2, wherein said electronic device further includes an elastic member that biases said movable member in a direction for retracting to an outer surface of said first chassis in order to bias said slide member in a direction for moving said slide member to another side in said axial direction.

6. The electronic device of claim 1, wherein said slide member moves to one side in said axial direction by said pressure receiving surface of said cylindrical connecting section being pressed by said cam surface of said cylindrical cam member, which rotates on said outer peripheral surface of said first shaft, and moves to another side in said axial direction by said pressure receiving section being pressed by said second cam surface of said cylindrical cam member, which rotates on said outer peripheral surface of said first shaft.

7. The electronic device of claim 1, wherein said cam surface and said pressure receiving surface have twisted shapes that are inclined in a direction to be in slide contact with each other.

8. The electronic device of claim 7, further comprising a key depressing mechanism that includes a rotating shaft member provided along said key top, and a pressing piece that projects from an outer peripheral surface of said rotating shaft member to a key top side and is configured to press said key top downward, wherein, when said slide member moves in said axial direction, said rotating shaft member of said key depressing mechanism rotates and said pressing piece depresses said key top.

9. The electronic device of claim 8, further comprising a second slide member that moves in conjunction with the movement of said slide member in said axial direction in order to rotate said rotating shaft member, thereby depressing said key top by said pressing piece.

* * * * *